United States Patent
Slaughter et al.

(10) Patent No.: US 7,930,054 B2
(45) Date of Patent: Apr. 19, 2011

(54) METHOD AND SYSTEM FOR TOOLPATH GENERATION

(75) Inventors: Victor B. Slaughter, Manchester, MO (US); Christopher S. Huskamp, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 286 days.

(21) Appl. No.: 11/390,521

(22) Filed: Mar. 27, 2006

(65) Prior Publication Data
US 2007/0225856 A1 Sep. 27, 2007

(51) Int. Cl.
*G06F 19/00* (2011.01)

(52) U.S. Cl. .......................................... 700/119; 700/98

(58) Field of Classification Search ............... 205/70; 264/308, 40.1, 401, 255; 382/107, 196, 197, 382/199; 700/97, 98, 118, 119, 120, 123, 700/160, 162, 182, 187, 29; 703/1, 6–9; 707/E17.027, E17.051, E17.08; 156/155; 219/124.34; 438/50; 715/209
See application file for complete search history.

(56) References Cited

U.S. PATENT DOCUMENTS

| | | | | |
|---|---|---|---|---|
| 4,477,713 | A * | 10/1984 | Cook et al. | 219/124.34 |
| 5,303,141 | A * | 4/1994 | Batchelder et al. | 700/29 |
| 5,428,727 | A * | 6/1995 | Kurosu et al. | 715/209 |
| 5,705,117 | A * | 1/1998 | O'Connor et al. | 264/401 |
| 5,987,173 | A * | 11/1999 | Kohno et al. | 382/199 |
| 6,678,571 | B1 * | 1/2004 | Manners et al. | 700/120 |
| 6,813,594 | B2 * | 11/2004 | Guertin et al. | 703/6 |
| 7,063,524 | B2 * | 6/2006 | Farnworth et al. | 425/174.4 |
| 2002/0062909 | A1 * | 5/2002 | Jang et al. | 156/155 |
| 2002/0113331 | A1 * | 8/2002 | Zhang et al. | 264/40.1 |
| 2002/0129485 | A1 * | 9/2002 | Mok et al. | 29/527.2 |
| 2002/0171178 | A1 * | 11/2002 | Dean et al. | 264/401 |
| 2003/0032214 | A1 * | 2/2003 | Huang | 438/50 |
| 2005/0288813 | A1 * | 12/2005 | Yang et al. | 700/119 |
| 2006/0022379 | A1 * | 2/2006 | Wicker et al. | 264/255 |
| 2006/0215246 | A1 * | 9/2006 | Kerekes et al. | 359/201 |
| 2006/0237880 | A1 * | 10/2006 | Wicker et al. | 264/401 |
| 2007/0027660 | A1 * | 2/2007 | Swift | 703/1 |

OTHER PUBLICATIONS

Yong Zheng, "Enabling Computational Techniques For Tangential-Building Solid Freeform Fabrication", CASE Western Reserve University, Aug. 1997.*
Young Keun Choi, "Tool Path Generation And 3D Tolerance Analysis For Free-Form Surfaces", Texas A&M University, May 2004.*
Rajeev Dwivedi et al., "Automated Torch Path Planning Using Polygon Subdivision for Solid Freeform Fabrication Based on Welding", Southern Methodist University, 2004.*
Edson Costa Santos et al., "Rapid manufacturing of metal components by laser forming", Osaka University, Nov. 2, 2005.*
Jianzhong Ruan, "Automatic Process Planning and Toolpath Generation of a Multiaxis Hybrid Manufacturing System", University of Missouri-Rolla, 2005.*

(Continued)

*Primary Examiner* — Kidest Bahta
*Assistant Examiner* — Carlos Ortiz Rodriguez
(74) *Attorney, Agent, or Firm* — Yee & Associates, P.C.; Eric K. Satermo

(57) ABSTRACT

A system and method for toolpath creation is provided. The method includes exporting CAD defined 3-D geometry to a slicing module; slicing the 3-D geometry creating a set of 2-D patterns representing the 3-D geometry; generating vector code from the set of 2-D patterns; and translating the vector code to machine code.

17 Claims, 6 Drawing Sheets

OTHER PUBLICATIONS

Kai Zhang, "Research on the processing experiments of laser metal deposition shaping", Shenyang Institute of Automation, Chinese Academy of Sciences, Dec. 6, 2005.*

Rajeev Dwivedi et al., "An expert system for generation of machine inputs for laser-based multidirectional metal deposition", Southern Methodist University, Jan. 1, 2006.*

* cited by examiner

METHOD AND SYSTEM FOR TOOLPATH GENERATION

BACKGROUND

1. Field of Invention

This invention relates generally to manufacturing processes, and more particularly, to automated toolpath generation that can be used in deposition processes.

2. Background of the Invention

Shaped metal deposition (SMD) is an additive manufacturing method that deposits metal via Gas Tungsten Arc Welding (GTAW) methodically in a manner that generates a 3-D geometry. The current methods of producing toolpaths for the SMD process are highly inefficient as described below.

Traditional CNC toolpath generation (i.e. raw stock is used and the excess material is cut away to get the final product) software is employed and proceeds through several software packages prior to generating useable deposition path codes. Since no supports are used for building complex geometric features in CNC toolpath generation, parts that are deposited in the X-Y plane are rotated or the material feed head is moved to a position other than vertical for deposition. Therefore, traditional .STL files (in the StereoLithograpghy file format, incorporated herein by reference in its entirety), slice file, and vector code software cannot be applied as the parts must be rotated.

In additional prior art methods and systems, a computer aided drafting (CAD) drawing, having a 3-D geometry of the part to be built using the SMD Process, is obtained. Code for a mold to produce the part is extracted from the CAD data. Next, a toolpath is created to machine the actual mold. The mold toolpath code is then reverse engineered to determine the actual code to produce the part. This adds programming time and is cumbersome. In some cases, the time for creating the control program for generating the 3-D geometry is more than twice the actual build time of the part.

In view of the above, what is needed is a method and system for creating toolpaths that convert vector representations to machines instructions.

SUMMARY OF THE INVENTION

In one aspect of the present invention, a method for toolpath creation is provided. The method includes exporting CAD defined 3-D geometry to a slicing module; slicing the 3-D geometry creating a set of 2-D patterns representing the 3-D geometry; generating vector code from the set of 2-D patterns; and translating the vector code to machine code.

In another aspect of the present invention, a system for toolpath creation is provided. The system includes a CAD database for storing 3-D geometry of a part; a slicing module for receiving the 3-D geometry and slicing the 3-D geometry into a set of 2-D patterns; a toolpath generator for receiving the set of 2-D parameters and generating vector code from the 2-D patterns; and a machine code translator for translating the vector code to machine code.

In yet another aspect of the present invention, computer-executable process steps stored on a computer-readable medium for toolpath creation is provided. The computer-executable process steps include exporting CAD defined 3-D geometry to a slicing module; slicing the 3-D geometry creating a set of 2-D patterns representing the 3-D geometry; generating vector code from the set of 2-D patterns; and translating the vector code to machine code.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. The illustrated embodiment is intended to illustrate, but not to limit the invention. The drawings include the following.

DETAILED DESCRIPTION OF THE PREFERRED EMBODIMENTS

The present invention provides an automated method/system for generating toolpaths that are used to create three-dimensional products using deposition processes. The system can be implemented in software and executed by a computing system. To facilitate an understanding of the preferred embodiment, the general architecture and operation of a computing system will be described first. The specific process under the preferred embodiment will then be described with reference to the general architecture.

Figure 1:
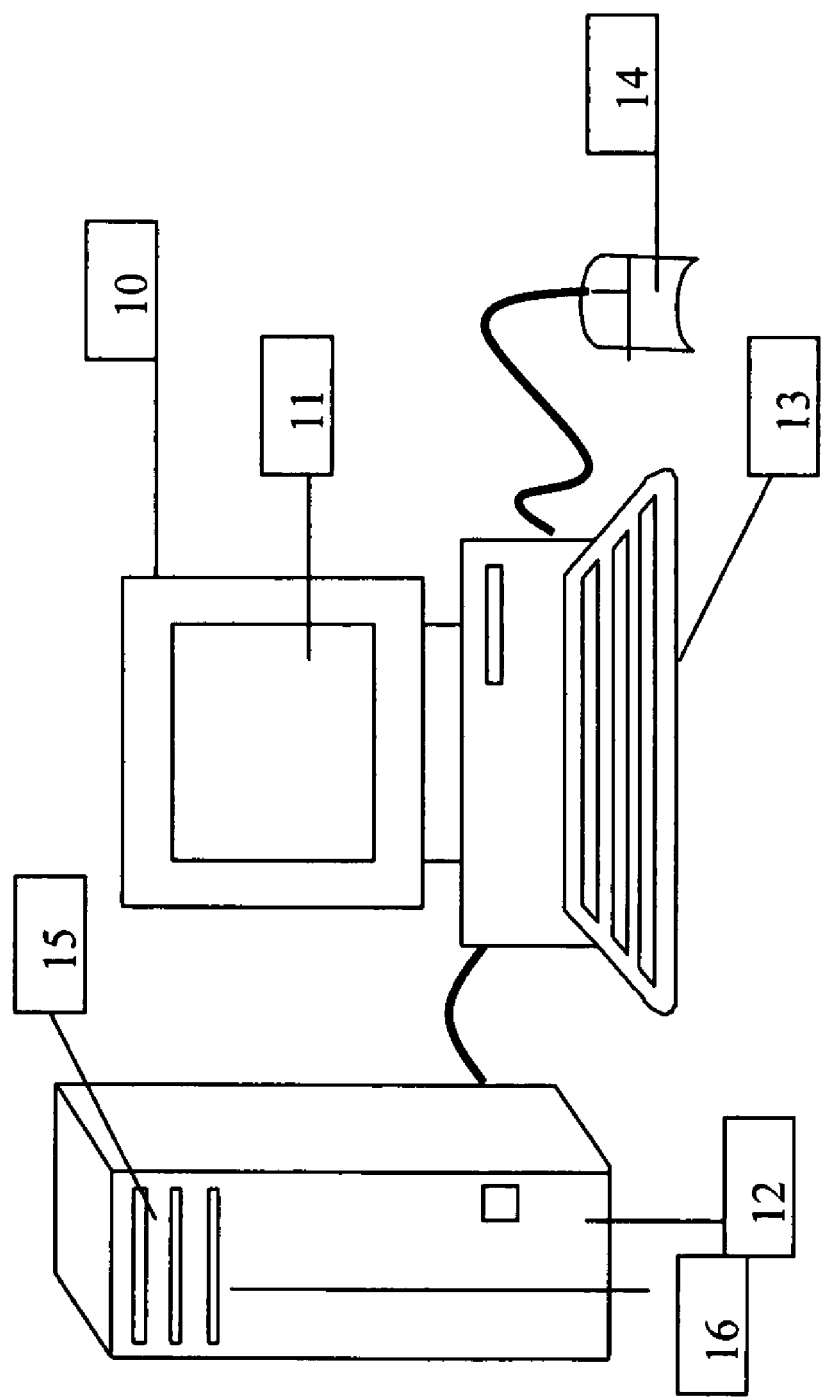
FIG. 1 shows a block diagram of a computing system for executing process steps, according to one aspect of the present invention.

Computing System:

FIG. 1 is a block diagram of a computing system for executing computer executable process steps according to one aspect of the present invention. FIG. 1 includes a host computer 10 and a monitor 11. Monitor 11 may be a CRT type, a LCD type, or any other type of color or monochrome display.

Also provided with computer 10 are a keyboard 13 for entering data and user commands, and a pointing device (for example, a mouse) 14 for processing objects displayed on monitor 11.

Computer 10 includes a computer-readable memory storage device 15 for storing readable data. Besides other programs, storage device 15 can store application programs including web browsers and computer executable code, according to the present invention.

According to one aspect of the present invention, computer 10 can also access computer-readable floppy disks storing data files, application program files, and computer executable process steps embodying the present invention or the like via a removable memory device 16 (for example, a CD-ROM, CD-R/W, flash memory device, zip drives, floppy drives and others).

A modem, an integrated services digital network (ISDN) connection, or the like also provide computer 10 with a network connection 12 to the World Wide Web (WWW) or to the intranet—the network of computers within a company or entity within the company. The network connection 12 allows computer 10 to download data files, application program files and computer-executable process steps embodying the present invention.

It is noteworthy that the present invention is not limited to the FIG. 1 architecture. For example, notebook or laptop computers, or any other system capable of connecting to a network and running computer-executable process steps, as described below, may be used to implement the various aspects of the present invention.

Figure 2:
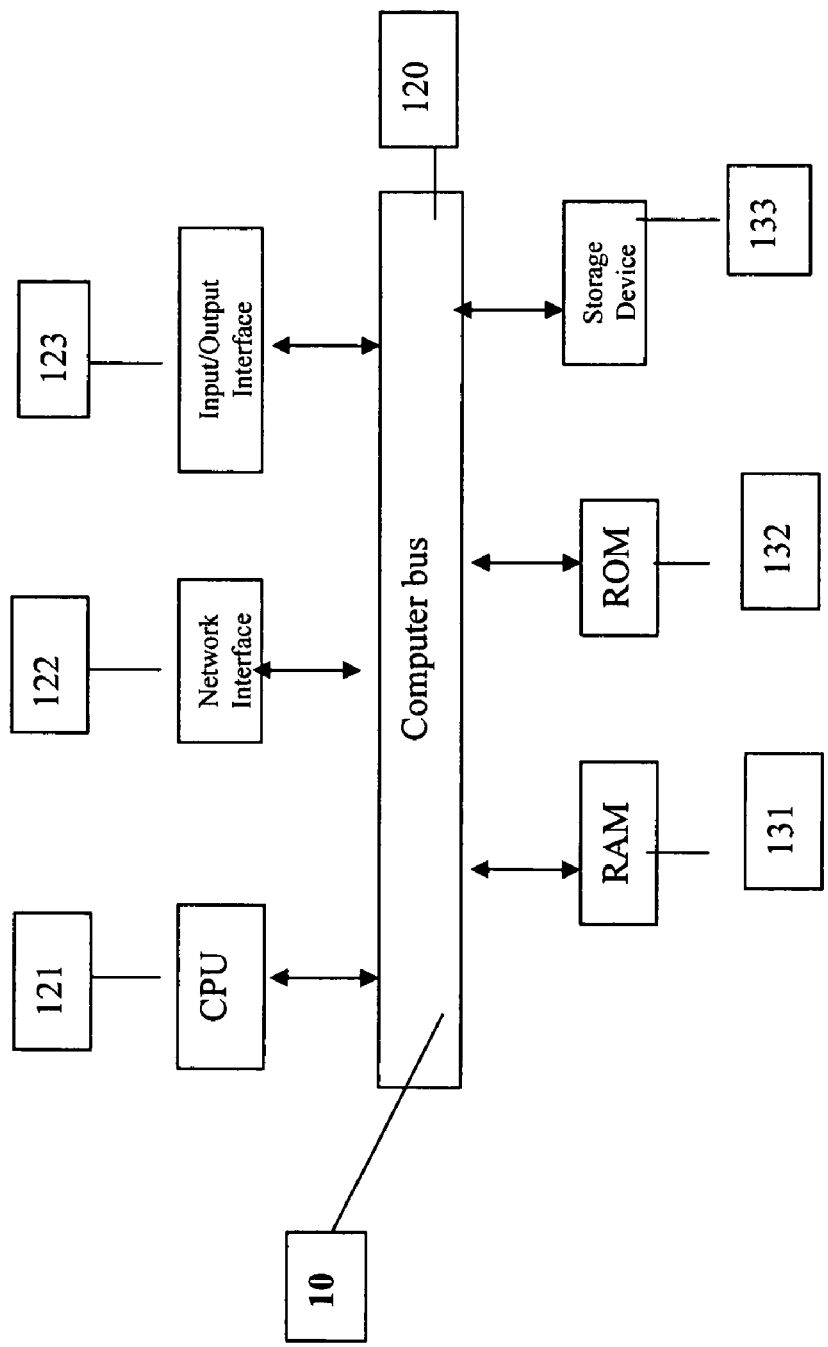
FIG. 2 shows the internal architecture of the computing system of FIG. 1.

FIG. 2 shows a top-level block diagram showing the internal functional architecture of computing system 10 that may be used to execute the computer-executable process steps, according to one aspect of the present invention. As shown in FIG. 2, computing system 10 includes a central processing unit (CPU) 121 for executing computer-executable process steps and interfaces with a computer bus 120.

Also shown in FIG. 2 are an input/output interface 123 that operatively connects output display device such as monitors (11), input devices such as keyboards (13) and pointing device such as a mouse (14).

A storage device 133 (similar to device 15) also interfaces to the computing device 10 through the computer bus 120. Storage device 133 may be disks, tapes, drums, integrated circuits, or the like, operative to hold data by any means, including magnetically, electrically, optically, and the like. Storage device 133 stores operating system program files, application program files, computer-executable process steps of the present invention, web-browsers and other files. Some of these files are stored on storage device 133 using an installation program. For example, CPU 121 executes computer-executable process steps of an installation program so that CPU 121 can properly execute the application program.

Random access memory ("RAM") 131 also interfaces with computer bus 120 to provide CPU 121 with access to memory storage. When executing stored computer-executable process steps from storage device 133, CPU 121 stores and executes the process steps out of RAM 131.

Read only memory ("ROM") 132 is provided to store invariant instruction sequences such as start-up instruction sequences or basic input/output operating system (BIOS) sequences.

The computing system 10 can be connected to other computing systems through the network interface 122 using computer bus 120 and a network connection (for example 12). The network interface 122 may be adapted to one or more of a wide variety of networks, including local area networks, storage area networks, wide area networks, the Internet, and the like.

In one aspect of the invention, a toolpath generator/translator software may be supplied on a CD-ROM or a floppy disk or alternatively could be read from the network via a network interface 122. In yet another aspect of the invention, the computing system 10 can load the toolpath generator/translator software from other computer readable media such as magnetic tape, a ROM, integrated circuit, or a magneto-optical disk.

Alternatively, the toolpath generator/translator software is installed onto the storage device 133 of the computing system 10 using an installation program and is executed using the CPU 121.

In yet another aspect, the toolpath generator/translator software may be implemented by using an Application Specific Integrated Circuit that interfaces with computing system 10.

Figure 3A:
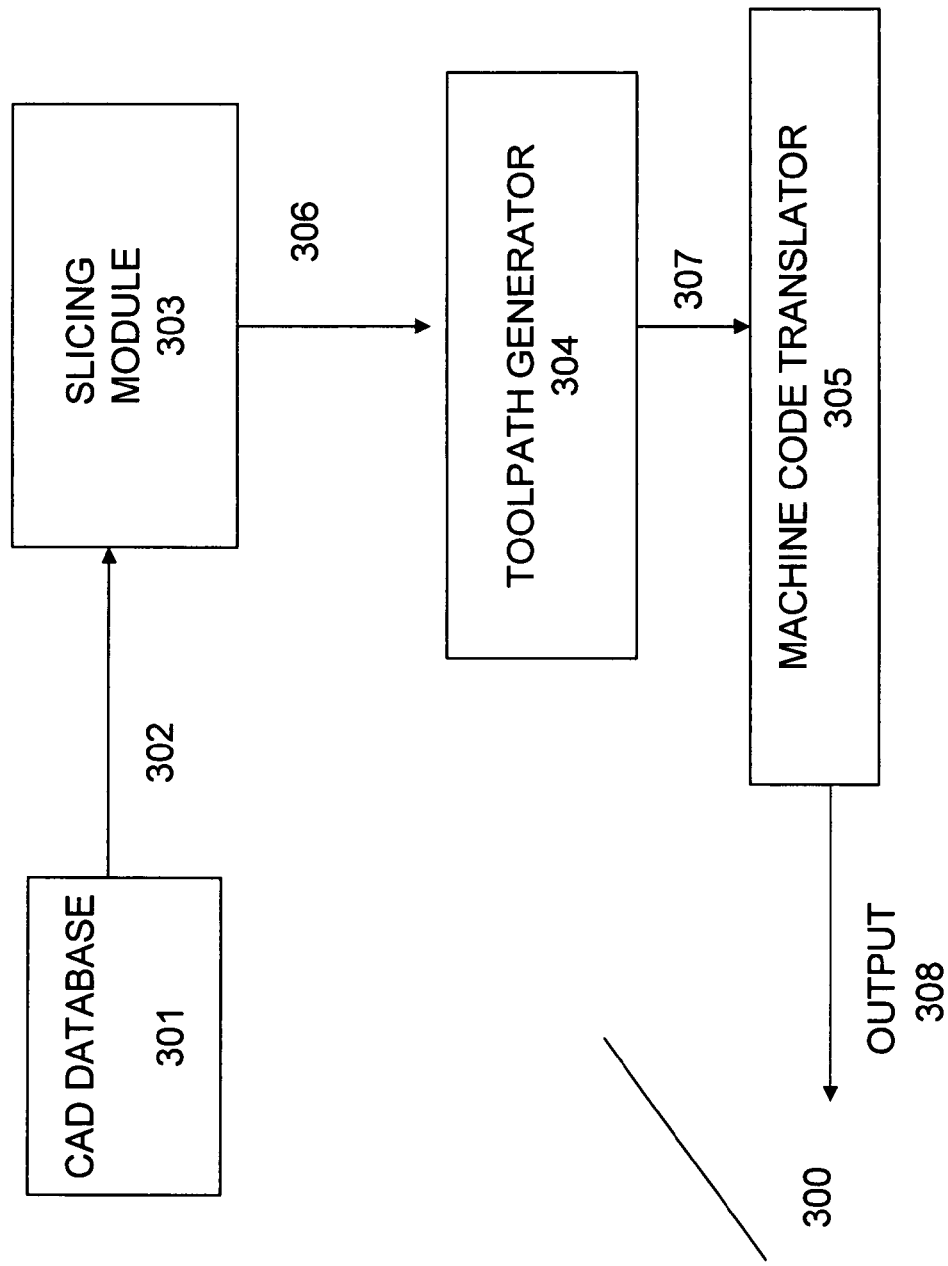
FIG. 3A shows a block diagram of a system for generating toolpath, according to one aspect of the present invention.

Turning to FIG. 3A, a block diagram of a system 300 for generating a toolpath, according to one aspect of the present invention is shown. CAD defined 3-D (three dimensional) geometry is stored in a CAD database 301 and exported in STereoLithography (.STL) file format (shown as 302) to a slicing module 303. The STL format is tessellated or triangular, i.e., it represents the solid body with sets of triangles.

After receiving the STL files, slicing module 303 slices the 3-D geometry based on machine parameters, creating a set of boundary contours. These contours are collectively referred to as a StereoLithography Contours (SLC) and are a set of 2-D patterns representing the 3-D geometry.

A toolpath generator 304 receives the set of 2-D patterns of the SLC file 306 from slicing module 303 and generates a set of contours 307, which define the path taken by the deposition head. Specialized software is utilized to analyze each layer (or 2-D pattern) of the SLC file. The specialized software examines the boundary contours, and produces contours in the form of vector codes. Two types of contours are produced and are referred to generally as Contours and Rasters. Contours will dictate toolpaths, which will define the boundaries of the geometry. The Rasters will dictate paths, which will deposit the bulk of the geometries cross sectional area.

Next, a machine code translator 305 receives the set of contours 307 and converts the contours, generally in the form of vectors, into machine code, queued, and executed by the SMD system. Machine code translator 305 then outputs machines instructions 308 for additive metal wire deposition.

Figure 3B:
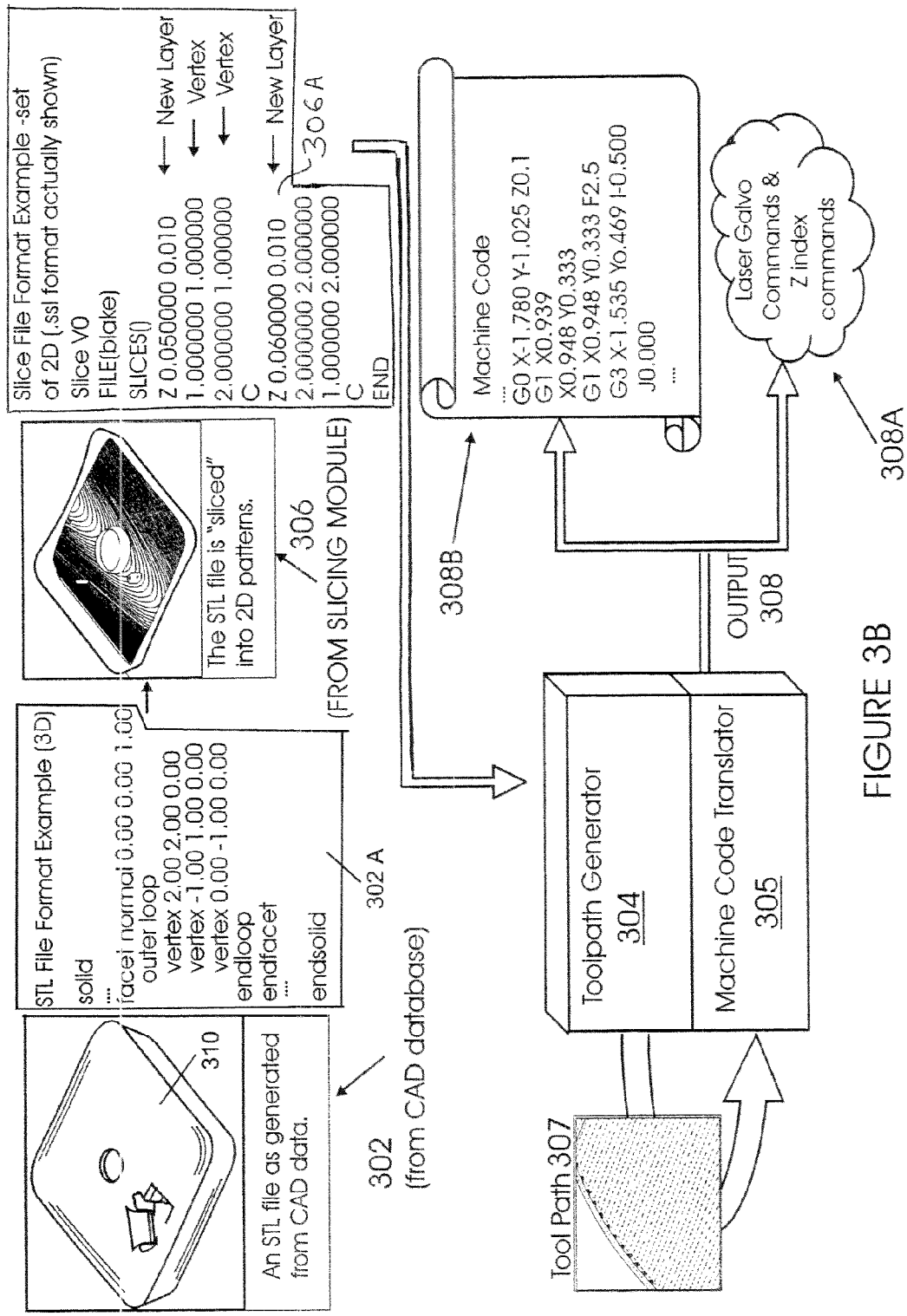
FIGS. 3B and 3C show pictorial diagrams of the system/process for generating toolpath, according to one aspect of the present invention.

FIG. 3B shows a pictorial diagram of system 300 for generating a toolpath in one aspect of the present invention. As discussed above, an STL file 302 is generated from CAD database 301. The STL file in this case shows the picture of a component 310 that needs to be manufactured by a deposition process. A STL file format example 302A shows representative alpha-numeric representation of a 3D STL file. Next, the STL file 302 is sliced into 2-D patterns (or layers) 306 and sent to toolpath generator 304. The 2-D code for the geometry is also shown in FIG. 3B. A slice file format example 306A shows alpha-numeric representation of a 2D slice file. As discussed above, the machine code translator 305 outputs machine instructions 308.

Toolpath 307 is generated by toolpath generator 304 and sent to machine code translator 305 which outputs 308 the translated code in galvo commands and Z index commands 308A or machine code 308B.

Figure 3C:
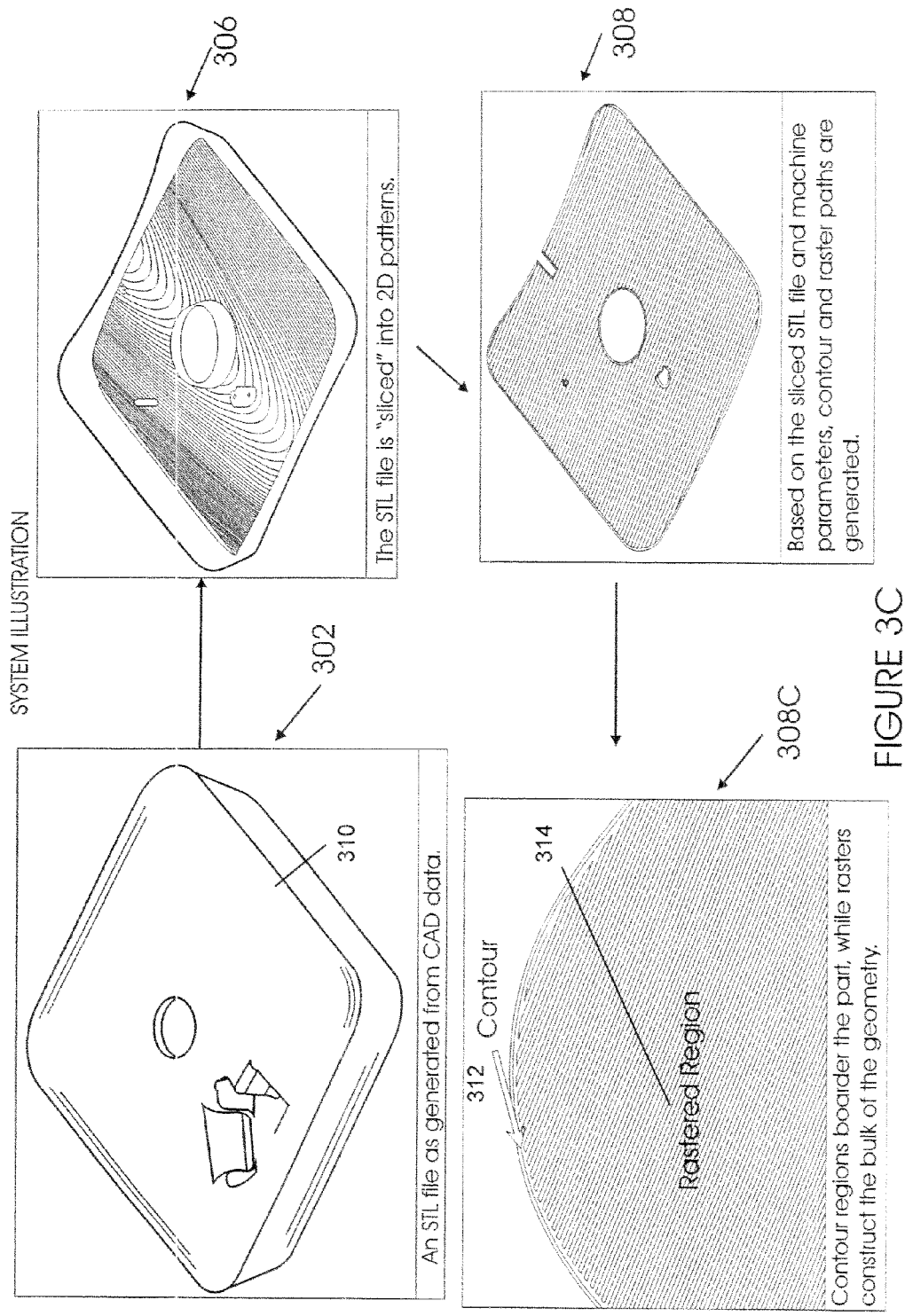

FIG. 3C shows another system 300 illustration for generating a toolpath in one aspect of the present invention. An STL file 302 generated from CAD database 301 for component 310 is sliced into 2-D patterns 306. Based on the sliced STL file and machine parameters, Contour and Raster paths 308 are generated. The Contour 312 regions border the part, while Rasters 314 construct the bulk of the geometry (as shown in 308C).

Figure 4:
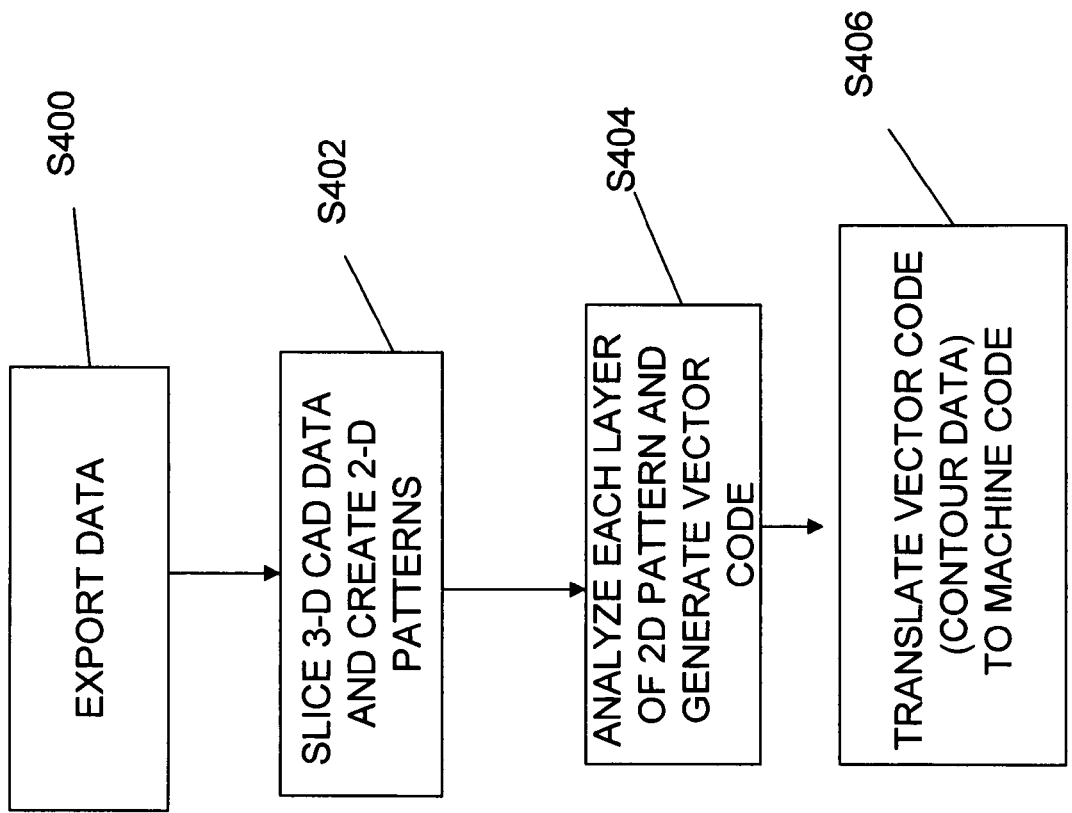
FIG. 4 shows the steps of generating a toolpath in one aspect of the present invention.

FIG. 4 shows the process steps of generating a toolpath, according to one aspect of the present invention. First, in step S400, 3-D data is exported from a CAD database 301. In step S402, the 3-D data is sliced creating 2-D pattern.

In step S404, each layer of the 2-D patterns is analyzed generating vector code. Finally, in step S406, the vector code (contour data) is translated to machine code for manufacturing a part.

The system and method of the present invention is not limited to the deposition of one material, or by one method, multiple materials may be deposited in the course of a build. Furthermore, various deposition methods may be utilized and the deposition of materials may be required to support the desired geometry.

The system and method described above reduces a series of complex 3-D problems into a series of simple 2-D problems, and also into a series of 1-D problems. The cumulative effect of this system and method is rapid file preparation, shortened elapsed time from CAD-to-Deposition, and less reliance on operator knowledge and experience.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for fabricating a part, the method comprising:
   creating a toolpath for an additive metal wire deposition machine to fabricate the part using additive metal wire deposition, including:
   exporting CAD defined 3-D geometry of the part to a slicing module; slicing the 3-D geometry of the part and creating a set of 2-D patterns representing the 3-D geometry of the part, wherein the set of 2-D patterns are a set of boundary contours;
   generating vector code from the set of 2-D patterns, wherein the vector code comprises contour data that defines the toolpath;
   and translating the vector code to machine code configured to execute in the additive metal wire deposition machine;
   executing the machine code in the additive metal wire deposition machine; and
   fabricating the part by additive metal wire deposition following the toolpath, using the machine code executed by the additive metal wire deposition machine.

2. The method of claim 1, wherein the 3-D geometry of the part is stored in a CAD database.

3. The method of claim 1, wherein the 3-D geometry of the part is exported in an STL file format.

4. The method of claim 1, wherein the set of boundary contours is comprised of two types of boundary contours including Contours and Rasters.

5. The method of claim 4, wherein the Contours dictate toolpaths to define boundaries of the geometry, and the Rasters dictate paths which deposit a bulk of the geometry's cross-section.

6. The method of claim 1, wherein the machine code is in laser galvo commands and Z index commands or machine code.

7. The method of claim 1, wherein the additive metal wire deposition includes depositing metal by gas tungsten arc welding.

8. A system for part fabrication, the system comprising:
   a toolpath creation system for an additive metal wire deposition system, including:
   a CAD database for storing 3-D geometry of a part;
   a slicing module for receiving the 3-D geometry and slicing the 3-D geometry into a set of 2-D patterns, wherein the set of 2-D patterns are a set of boundary contours;
   a toolpath generator for receiving the set of 2-D patterns and generating vector code from the 2-D patterns, wherein the vector code comprises contour data that defines a toolpath;
   and a machine code translator for translating the vector code to machine code configured to execute in the additive metal wire deposition system; and the additive metal wire deposition system executes the machine code and fabricates the part following the toolpath, using the machine code.

9. The system of claim 8, wherein the 3-D geometry is exported in an STL file format.

10. The system of claim 8, wherein the set of boundary contours is comprised of two types of contours including Contours and Rasters.

11. The system of claim 8, wherein the additive metal wire deposition system deposits metal by gas tungsten arc welding.

12. Computer-executable process steps stored on a computer-readable medium, the computer-executable process steps for a part fabrication, the computer-executable process steps executable to perform a method comprising:
    creating a toolpath for fabricating the part in an additive metal wire deposition system, including:
    exporting CAD defined 3-D geometry to a slicing module;
    slicing the 3-D geometry creating a set of 2-D patterns representing the 3-D geometry, wherein the set of 2-D patterns are a set of boundary contours;
    generating vector code from the set of 2-D patterns, wherein the vector code comprises contour data that defines the toolpath; and
    translating the vector code to machine code configured to execute in the additive metal wire deposition system;
    and executing the machine code in the additive metal wire deposition system to fabricate the part following the toolpath.

13. The computer executable process steps of claim 12, wherein the CAD defined 3-D geometry is stored in a CAD database.

14. The computer executable process steps of claim 12, wherein the 3-D geometry is exported in an STL file format.

15. The computer executable process steps of claim 12, wherein the set of boundary contours is comprised of two types of contours including Contours and Rasters.

16. The computer executable process steps of claim 12, wherein the machine code is in laser galvo commands and Z index commands or machine code.

17. The computer executable process steps of claim 12, wherein the additive metal wire deposition includes depositing metal by gas tungsten arc welding.

* * * * *